June 3, 1952     W. R. NORMAN     2,599,276
WICK HYPSOMETER
Filed Aug. 23, 1949
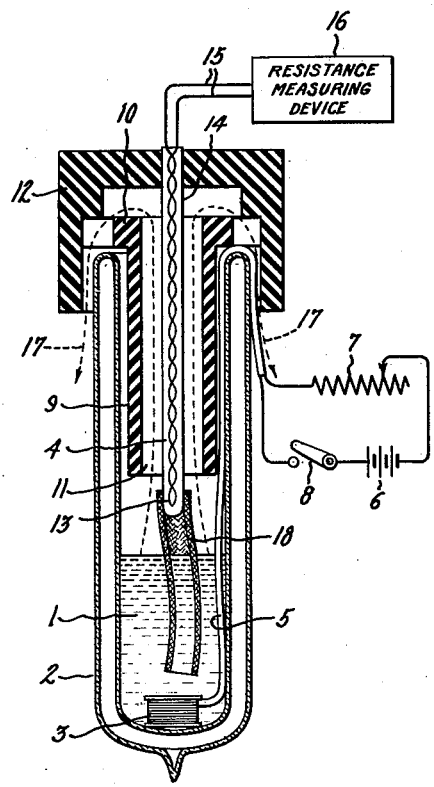
Inventor:
Wayne R. Norman,
by Paul A. Frank
His Attorney Patented June 3, 1952

2,599,276

UNITED STATES PATENT OFFICE 2,599,276

WICK HYPSOMETER

Wayne R. Norman, Schenectady, N. Y., assignor to General Electric Company, a corporation of New York Application August 23, 1949, Serial No. 111,899

5 Claims. (Cl. 73—384)

My invention relates to pressure measuring apparatus of the hypsometer type and has as its principal object to provide an improvement in a hypsometer of the type disclosed and claimed in an application Serial No. 111,913 of Theodore A. Rich, filed August 23, 1949, and assigned to the same assignee as the present invention, wherein my invention is briefly described but not claimed.

In a hypsometer apparatus of the type mentioned a liquid is arranged to be boiled in a vessel and the boiling temperature of the liquid is sensed by a suitable temperature-responsive device. Since the temperature of a boiling liquid is dependent on the ambient pressure in the vicinity thereof the response of a device arranged to sense the boiling temperature may be made indicative of the ambient pressure to which the boiling liquid is subjected. While it is possible to determine the temperature of a boiling liquid by immersion of the temperature-sensing element therein it has been found that erratic results may be obtained by so doing, due to conditions of superheating which may exist in the liquid. Accordingly, it has been found that the most reliable determinations of the temperature of a boiling liquid in a hypsometer may be obtained by sensing the temperature of the vaporous atmosphere in the vicinity of the liquid. Thus, in a typical hypsometer, a temperature-responsive element, such as a thermistor, may be positioned directly above a boiling liquid so that the element is substantially surrounded by the vapors thereof.

While such an arrangement has been found to give generally more satisfactory results than are obtained by positioning a temperature-sensing device in the liquid itself, conditions of superheating or supercooling may also exist in the vapors in certain cases, depending particularly on the temperature of surrounding surfaces. For example, in hypsometers in which vessels having a relatively poor thermal insulation are employed, heat losses may be sufficiently great through the walls of the vessel so that supercooling of the vapors is effected by the hypsometer walls. On the other hand, in hypsometers in which vessels having relatively good thermal insulation are employed, the vapors may actually be superheated by the walls of the hypsometer. In either case, inaccurate indications of vapor temperature and ambient pressure may be obtained in the use of the hypsometer.

In accordance with my invention, I provide an arrangement for stabilizing the temperature sensed by a temperature-sensing element in a hypsometer of the type described which consists in providing a film of liquid in an atmosphere of its own vapor on the temperature-sensing element in a hypsometer, the film of liquid being obtained by the use of a wick in a manner similar to the use of such a wick in wet-bulb thermometers and the like as employed in making measurements of relative humidity.

For a better understanding of my invention, attention is now directed to the following description taken in connection with single figure of the accompanying drawing, and to the appended claims in which the features of my invention believed to be novel are more particularly pointed out.

Referring now to the drawing, there is shown, in longitudinal section, a hypsometer device for the type disclosed in the above-mentioned Rich application and embodying certain features of my invention. The device shown is designed particularly for use in the measurement of relatively high altitudes in connection with radiosonde apparatus or the like but is not limited to this particular use.

The hypsometer shown in the drawing comprises principally a quantity of liquid I contained in a suitable vessel 2, a heating device 3, and a temperature-sensing element 4. Vessel 2 is represented as being a double-walled vacuum flask of conventional construction, the walls thereof providing a relatively high degree of thermal insulation.

Heating element 3 is represented as an electric heating coil immersed in liquid I. The connections to heating element 3 are made by a pair of conductors 5 carried along the inner wall of flask 2 and over the mouth thereof. Electric energy is supplied to heating element 3 by the use of a suitable source such as a dry cell 6 and is adjusted by the use of an adjustable resistance 7 connected in series with heating element 3, dry cell 6 and a switch 8.

An insert 9 formed of a molded plastic or other suitable material having a relatively high degree of thermal insulation is inserted in the mouth of flask 2 and supported therein by a flange 10. A tubular passage 11 is provided through insert 9 at the axial center thereof to serve as an escape path for the vapors of liquid I. A cap 12, preferably formed of the same material as insert 9, is provided over insert 9 and serves as thermal insulation for the mouth of flask 2. Cap 12 also provides support for temperature-sensing element 4 which is positioned at the approximate axial center of passage 11 and is arranged to extend into flask 2 slightly beyond the lower extremity of insert 9.

Temperature-sensing element 4 is represented in the embodiment herein described as comprising a thermistor 13 positioned in a tube 14 formed of glass or other suitable material. Connections to thermistor 13 are made by the use of a pair of conductors 15 extending through tube 14 to the outside of the hypsometer. The electrical resistance of thermistor 13 which is dependent on the temperature thereof, may be measured by any suitable resistance measuring device 16.

In the operation of the hypsometer described, if it is assumed that the temperature of liquid 1 is below the boiling point thereof, boiling of liquid 1 may be effected by closing switch 8 and supplying current to heating element 3. Once boiling has been established, it may continue for a considerable length of time even after switch 8 is opened and no additional energy is supplied to liquid 1. In other cases, it may be necessary to supply energy continuously to liquid 1 to maintain boiling thereof. Whichever may be the case, as liquid 1 boils an atmosphere of the vapors thereof is formed above liquid 1. The boiling vapors are forced from the hypsometer along the path generally indicated by broken line 17.

It will be noted that thermistor 13 of temperature-sensing element 4 is positioned directly in the vaporous atmosphere above liquid 1 and thus is arranged to sense the vapor temperature thereof. In accordance with my invention, I provide a wick 18 arranged to encase the lower extremity of temperature sensing element 4, and to dip into liquid 1. A portion of liquid 1 is thus conveyed by wick 18 to the vicinity of thermistor 13 of temperature-sensing element 4 and accordingly a film of liquid 1 is provided on a portion thereof. Wick 18 is preferably formed of a pliable absorbent material. I have found that a convenient material for wick 18 is conventional woven cotton braid of the type employed in insulating electrical conductors. It will be obvious, however, that other materials and arrangements may be employed in providing a wick such as wick 18, and my invention is not limited to the material and arrangement shown and described herein.

An important advantage of my invention is that by the use of a wick in a hypsometer the temperature-sensing element thereof is covered by a film of liquid in an atmosphere of its own vapor, and accordingly, the temperature sensed by the temperature-sensing element is maintained substantially at the true boiling temperature of the liquid.

Referring again to the drawing, it will be seen that should the inner wall of flask 2 tend to retain a substantial amount of heat, thereby tending to superheat the vapor in the region of temperature-sensing element 4, evaporation tends to take place from the film of liquid provided thereon by wick 18, thereby lowering the temperature of sensing element 4 to the true boiling temperature of liquid 1. Conversely, should there be a tendency of the vapors in the region of sensing element 4 to be cooled below the boiling temperature of liquid 1, compensation is provided by condensation of the vapors on the film of liquid provided on sensing element 4. Therefore, the presence of a film of liquid 1 on temperature-sensing element 4 in the presence of an atmosphere of liquid 1 as provided by wick 18, in accordance with my invention, tends to create a condition of thermal equilibrium, causing temperature-sensing element 4 to be maintained substantially at the true boiling temperature of liquid 1.

While I have shown and described a preferred embodiment of my invention, it will be understood that my invention may well take other forms and I, therefore, aim in the appended claims to cover all such changes and modifications as fall within the true spirit and scope of my invention.

What I claim as new and desire to secure by Letters Patent of the United States is:

1. A pressure measuring apparatus comprising a liquid subjected to an ambient pressure, means to contain said liquid, means to effect boiling of said liquid thereby creating an atmosphere of vapors of said liquid in proximity therewith, said vapors having a temperature dependent on said pressure, a temperature-responsive element arranged to sense said temperature, the response of said element being indicative of said pressure, and means to convey a portion of said liquid to said element to provide wetting thereof by said liquid in said atmosphere, said means comprising a wick having portions contacting both said temperature responsive element and said liquid.

2. A pressure measuring apparatus comprising a liquid subjected to an ambient pressure, means to contain said liquid, means to effect boiling of said liquid thereby creating an atmosphere of vapors of said liquid in proximity therewith, said vapors having a temperature dependent on said pressure, a temperature-responsive electrical element arranged to sense said temperature, the response of said element being indicative of said pressure, and means to convey a portion of said liquid to said element to provide wetting thereof by said liquid in said atmosphere, said means comprising a wick, one end of which is disposed about said element and the other end in said liquid.

3. A pressure measuring apparatus comprising a liquid subjected to an ambient pressure, means to contain said liquid, means to effect boiling of said liquid thereby creating an atmosphere of vapors of said liquid in proximity therewith, said vapors having a temperature dependent on said pressure, a temperature-responsive resistance element arranged to sense said temperature, the resistance of said element being indicative of said pressure, and means to convey a portion of said liquid to said element to provide wetting thereof by said liquid in said atmosphere, said means comprising a wick having portions contacting both said temperature responsive element and said liquid.

4. A pressure measuring apparatus comprising a liquid subjected to an ambient pressure, means to contain said liquid, means to effect boiling of said liquid thereby creating an atmosphere of vapors of said liquid in proximity therewith, said vapors having a temperature dependent on said pressure, a thermistor arranged to sense said temperature, the resistance of said thermistor being indicative of said pressure, and means to convey a portion of said liquid to said element to provide wetting thereof by said liquid in said atmosphere, said means comprising a wick having portions contacting both said temperature responsive element and said liquid.

5. A pressure measuring apparatus comprising a liquid subjected to an ambient pressure, means to contain said liquid, means to effect boiling of said liquid thereby creating an atmosphere of vapors of said liquid in proximity therewith, said vapors having a temperature dependent on said pressure, a temperature-responsive element arranged to sense said temperature, the response of said element being indicative of said pressure, and a wick arranged to provide a film of said liquid on said element in said atmosphere, portions of said wick contacting both said temperature responsive element and said liquid.

WAYNE R. NORMAN.

REFERENCES CITED

The following references are of record in the file of this patent:

UNITED STATES PATENTS

| Number | Name | Date |
|---|---|---|
| 2,427,931 | Spanner | Sept. 23, 1947 |

OTHER REFERENCES

Ebulliometric Measurements by W. Swietoslawski, Reinhold Publishing Corp. (1945), pages 3–5, 13, 21–22 and 37.